United States Patent [19]

Morandi et al.

[11] Patent Number: 4,896,915
[45] Date of Patent: Jan. 30, 1990

[54] WIND DEFLECTOR PLATE FOR SNOW PLOW

[76] Inventors: J. Eric Morandi, 2218 Saw Mill River Rd., Elmsford, N.Y. 10523; George Spector, 233 Broadway, Room 3615, New York, N.Y. 10007

[21] Appl. No.: 870,831

[22] Filed: Jun. 5, 1986

[51] Int. Cl.⁴ .............................................. B60K 11/00
[52] U.S. Cl. .................................. 296/180.1; 296/91; 37/241; 180/68.1
[58] Field of Search ...................... 296/15, 91; 37/241, 37/266; 180/68.1, 68.6

[56] References Cited

U.S. PATENT DOCUMENTS 4,547,013 10/1985 McDaniel .............................. 296/91
4,587,750 5/1986 Carson ................................. 180/68.1

Primary Examiner—Robert R. Song

[57] ABSTRACT

A wind deflector for a snow plow on a motor vehicle that has a plow pump bar and a radiator. The deflector consists of a deflecting plate mounted to the pump bar so that when the plow is in position the deflecting plate will deflect air from above the plow down behind the plow and into the radiator of the motor vehicle to prevent overheating. In a modification an elongated funnel shaped deflecting housing is mounted to top of the plow in place of the deflecting plate.

5 Claims, 1 Drawing Sheet

U.S. Patent  Jan. 30, 1990  4,896,915
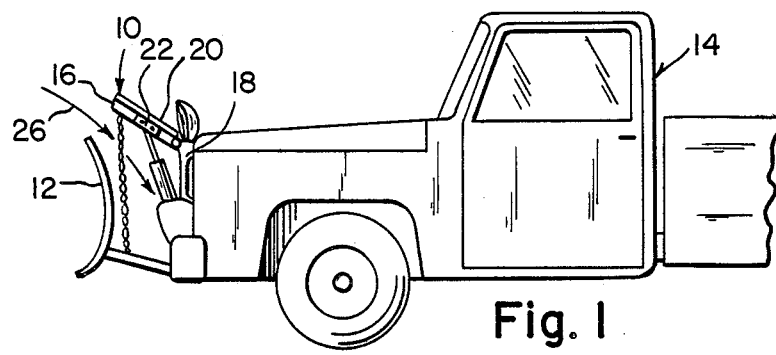
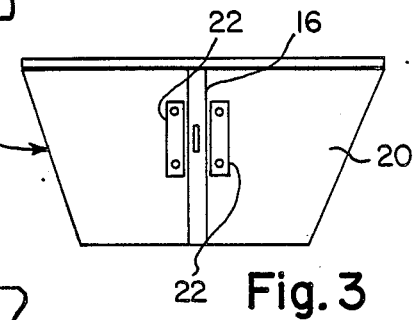
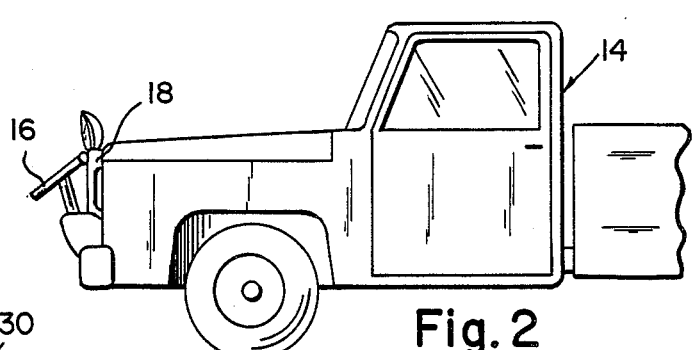
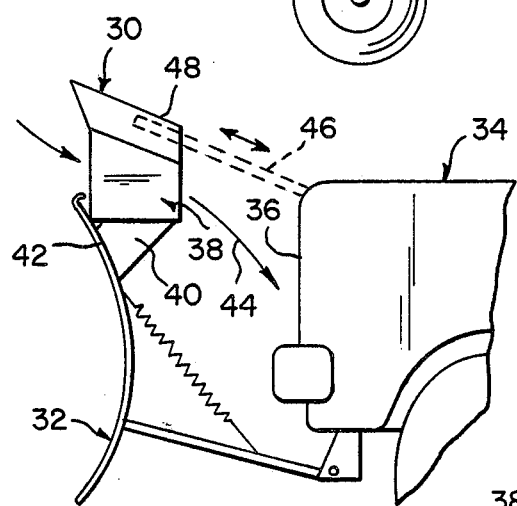
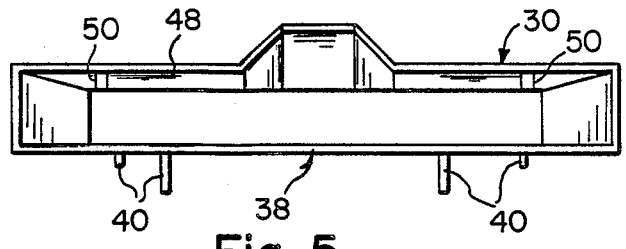
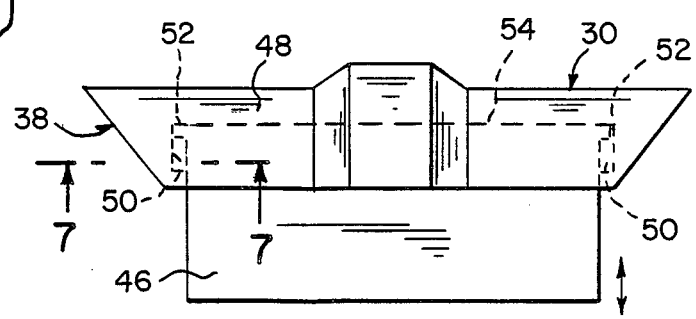
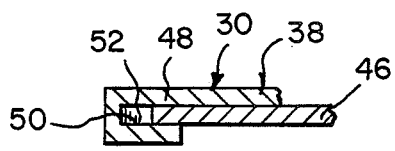

WIND DEFLECTOR PLATE FOR SNOW PLOW

BACKGROUND OF THE INVENTION

The instant invention relates generally to air deflectors for motor vehicles and more specifically it relates to a wind deflector for a snow plow on a motor vehicle.

Numerous air deflectors for motor vehicles have been provided in prior art that are adapted to reduce drag of air flowing against frontal surfaces during the vehicles movements. For example, U.S. Pat. Nos. 4,409,309; 4,214,786 and 4,262,954 all are illustrative of such prior art. While these units may be suitable for the particular purpose to which they address, they would not be as suitable for the purposes of the present invention as heretofore described.

SUMMARY OF THE INVENTION

A primary object of the present invention is to provide a wind deflector for a snow plow on a motor vehicle that will overcome the shortcomings of the prior art devices.

Another object is to provide a wind deflector for a snow plow on a motor vehicle that is mounted to plow pump bar so that when the plow is in an up position the wind deflector will deflect air from above the plow down behind the plow and into the radiator.

Another object is to provide a wind deflector for a snow plow on a motor vehicle that is mounted directly to the top of the plow to deflect air from above the plow down behind the plow and into the radiator.

A further object is to provide a wind deflector for a snow plow on a motor vehicle that is simple and easy to use.

A still further object is to provide a wind deflector for a snow plow on a motor vehicle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claim.

BRIEF DESCRIPTION OF THE DRAWING FIGURES

FIG. 1 is a side elevational view of the invention mounted to the pump bar of a plow on a conventional pick up-type motor vehicle.

FIG. 2 is a side elevational view similar to FIG. 1 with the pump bar in a down position with the invention and the plow removed therefrom.

FIG. 3 is a side perspective view of the invention.

FIG. 4 is a side elevational view of a modification mounted directly to the top of the plow on the conventional pick up-type motor vehicle.

FIG. 5 is a front view thereof.

FIG. 6 is a top view thereof having an adjustable extension plate.

FIG. 7 is an enlarged cross sectional view taken along line 7—7 in FIG. 6 showing the track therein.

DETAILED DESCRIPTION OF THE PREFERRED EMBODIMENTS

Turning now descriptively to the drawings, in which similar reference characters denote similar elements throughout the several views, FIGS. 1 and 3 illustrates a wind deflector 10 for a snow plow 12 on a motor vehicle 14 that has a plow pump bar 16 and a radiator 18. The deflector 10 consists of a flat deflecting plate 20 and a pair of spaced apart mounting brackets 22 extending downwardly from the deflecting plate 20. A plurality of bolts, rivets, welding or the like are used for securing brackets 22 to deflecting plate 20. When the plow 12 is in position the deflecting plate 20 will deflect air 26 from above the plow 12 down behind the plow and into the radiator 18 of the motor vehicle to prevent overheating.

FIG. 2 shows the motor vehicle 14 without the plow 12 attached. The pump bar 16 is down and the wind deflector 10 is removed therefrom for it is not needed in this situation to cool the radiator 18.

FIGS. 4 to 6 illustrate a modified wind deflector 30 for a snow plow 32 on a motor vehicle 34 that has a radiator 36. The deflector 30 consists of an elongated funnel shaped deflecting housing 38 and a plurality of mounting brackets 40 extending downwardly from the deflecting housing 38 for securing the deflecting housing to top 42 of the plow 32 by conventional means such as welding or the like.

When the plow 32 is in position the deflecting housing 38 will deflect air 44 therethrough to go down behind the plow 32 and into the radiator 36 of the motor vehicle 34 to prevent overheating.

The wind deflector 30 further contains an adjustable extension plate 46 extending from top portion 48 of the deflecting housing 38 to top of the radiator 36 of the motor vehicle 34. The extension plate 46 will increase the amount of deflected air 44 into the radiator 36 of the motor vehicle 34.

As shown in FIGS. 6 and 7 the top portion 48 of the deflecting housing 38 has a pair of spaced apart tracks 50 therein. The extension plate 46 has a pair of followers 52. Each of the followers 52 are formed sidewardly from forward edge 54 thereof. The followers 52 ride in the tracks 50 making the extension plate 46 adjustable for various sized motor vehicles 34 and collapsible for storage purposes.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A wind deflector for a snow plow on a motor vehicle having a plow pump bar and a radiator, said deflector comprising:
   (a) a deflecting plate mounted on said pump bar;
   (b) a pair of spaced apart mounting brackets extending downwardly from said deflecting plate; and
   (c) means for securing said brackets of said deflecting plate to said plow pump bar so that when said plow is in position said deflecting plate will deflect air from above said plow down behind said plow and into said radiator of said motor vehicle to prevent overheating.

2. A wind deflector for a snow plow on a motor vehicle having a radiator, said deflector comprising:
(a) an elongated funnel shaped deflecting housing;
(b) a plurality of mounting brackets extending downwardly from said housing;
(c) means securing said brackets to a top portion of said plow;
(d) an extension deflector plate slideably mounted on said housing for rearward adjustment to increase the amount of deflected air against the radiator.

3. A wind deflector as recited in claim 2, wherein said deflector plate extends from a top portion of said deflecting housing to top of said radiator of said motor vehicle.

4. A wind deflector as recited in claim 3, further comprising:
(a) said top portion of said deflecting housing having a pair of spaced apart tracks therein; and
(b) said extension plate having a pair of followers, each of said followers formed sidewardly from forward edge thereof so that said followers ride in said tracks making said extension plate adjustable for various sized motor vehicles and collapsible for storage purposes.

5. A wind deflector as in claim 1, further including means connecting said plow with said pump bar whereby movement upward of said pump bar positions said plow operatively when said plate is properly positioned to deflect air to the radiator.

* * * * *